United States Patent
Tachi et al.

(10) Patent No.: US 9,281,101 B2
(45) Date of Patent: Mar. 8, 2016

(54) ELECTRIC WIRE WITH TERMINAL AND METHOD FOR PRODUCING THE SAME

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Kentaro Tachi, Yokkaichi (JP); Tetsuya Nakamura, Yokkaichi (JP); Katsufumi Matsui, Yokkaichi (JP); Kouji Fukumoto, Yokkaichi (JP); Masaharu Suetani, Yokkaichi (JP); Daisuke Hashimoto, Yokkaichi (JP); Toshiya Hirooka, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 8 days.

(21) Appl. No.: 14/362,299

(22) PCT Filed: Nov. 30, 2012

(86) PCT No.: PCT/JP2012/081172
§ 371 (c)(1),
(2) Date: Jun. 2, 2014

(87) PCT Pub. No.: WO2013/084829
PCT Pub. Date: Jun. 13, 2013

(65) Prior Publication Data
US 2014/0318862 A1    Oct. 30, 2014

(30) Foreign Application Priority Data
Dec. 8, 2011    (JP) .................... 2011-268445

(51) Int. Cl.
H02G 15/04    (2006.01)
H01B 7/282    (2006.01)
(Continued)

(52) U.S. Cl.
CPC ........ H01B 7/2825 (2013.01); B29C 45/14467 (2013.01); B29C 45/14639 (2013.01);
(Continued)

(58) Field of Classification Search
CPC ............................... H02G 15/04; H02G 15/23
USPC ................................................ 174/74 R, 77 R
See application file for complete search history.

(56) References Cited

U.S. PATENT DOCUMENTS 6,242,097 B1 * 6/2001 Nishiguchi et al. ........... 428/383
8,403,690 B2 * 3/2013 Sawamura .................... 439/203
(Continued)

FOREIGN PATENT DOCUMENTS

JP    A 2006-123458    5/2006
JP    A 2009-135105    6/2009
JP    A 2010-129525    6/2010

OTHER PUBLICATIONS

Feb. 12, 2013 Search Report issued in International Patent Application No. PCT/JP2012/081172 (with translation).

*Primary Examiner* — Chau N Nguyen
(74) *Attorney, Agent, or Firm* — Oliff PLC

(57) ABSTRACT

An electric wire with a terminal may include an insulated electric wire that may include an insulating coating of polyolefin based resin, an adhesive layer that may be formed over an entire circumference of a surface of the insulating coating, and a waterproofing resin portion that may be formed by insert molding. The waterproofing resin portion may cover a region between the adhesive layer of the insulated electric wire and a portion where the metal terminal is connected to a core wire. The adhesive layer may include a composition of a copolymer of ethylene and glycidyl methacrylate and a phenol based curing agent. The waterproofing resin portion may include aromatic nylon.

19 Claims, 3 Drawing Sheets

(51) Int. Cl.
      H01R 4/70      (2006.01)
      H01R 43/00     (2006.01)
      B29C 45/14     (2006.01)
      H01B 13/08     (2006.01)
      H01B 3/44      (2006.01)
      H01R 11/12     (2006.01)
      B29L 31/34     (2006.01)
      H01B 3/30      (2006.01)

(52) U.S. Cl.
      CPC ............ *H01B3/441* (2013.01); *H01B 3/447* (2013.01); *H01B 13/08* (2013.01); *H01R 4/70* (2013.01); *H01R 43/005* (2013.01); *B29L 2031/3462* (2013.01); *H01B 3/308* (2013.01); *H01R 11/12* (2013.01)

(56) References Cited

U.S. PATENT DOCUMENTS

| | | | |
|---|---|---|---|
| 8,664,528 B2 * | 3/2014 | Ooishi et al. | 174/72 A |
| 2009/0015138 A1 * | 1/2009 | Daicho et al. | 313/503 |
| 2013/0196134 A1 * | 8/2013 | Carney et al. | 428/220 |

* cited by examiner

| | EC1 (25°C) | EC2 (150°C) | EC3 (−40°C) | EC4 (−40~100°C) |
|---|---|---|---|---|
| S0 | OK | OK | OK | OK |
| S1 | NG | OK | NG | NG |
| S2 | NG | OK | NG | NG |

ELECTRIC WIRE WITH TERMINAL AND METHOD FOR PRODUCING THE SAME

CROSS-REFERENCE TO RELATED APPLICATIONS

This application claims priority to International Application No. PCT/JP2012/081172, filed on Nov. 30, 2012, and to Japanese Patent Publication No. 2011-268445, filed on Dec. 8, 2011, the disclosures of both of which are incorporated herein by reference in their entireties.

TECHNICAL FIELD

Embodiments of the present application relate to an electric wire with a terminal including an insulated electric wire and a metal terminal provided at the end portion thereof, and a method for producing the electric wire with a terminal.

BACKGROUND

Recently, in wire harnesses to be mounted in cars, better water resistance is desired for electric wires with a terminal including an insulated electric wire and a metal terminal provided at the end portion thereof. Electric wires with a terminal having water resistance include a waterproofing resin portion that covers a waterproof region at the end portion. Hereinafter, electric wires with a terminal including a waterproofing resin portion are referred to as "waterproof electric wires with a terminal".

The waterproofing resin portion is made of a synthetic resin material and is formed by insert molding using, as an insert portion, a protected region including a region between an insulating coating at the end portion of the insulated electric wire and a portion where the metal terminal is connected to a core wire so as to cover the protected region.

Moreover, in a process for producing the waterproof electric wire with a terminal, before the insert molding of the waterproofing resin portion is performed, an adhesive is applied all over the circumference of the surface of the insulating coating at the end portion of the insulated electric wire. This adhesive becomes an adhesive layer that bonds the insulating coating and the waterproofing resin portion while closing a gap between the insulating coating and the waterproofing resin portion. This adhesive layer also serves as a water stopping portion that prevents the infiltration of water.

In the waterproof electric wire with a terminal, the coefficient of thermal expansion of the insulating coating is different from the coefficient of thermal expansion of the waterproofing resin portion, and therefore, the adhesive layer needs to have elasticity capable of coping with the difference in the thermal expansion between the insulating coating and the waterproofing resin portion. Generally, an adhesive of silicone based resin or rubber based resin having water resistance and elasticity is used as a material for an adhesive serving as a water stopping agent.

However, when the insulated electric wire includes an insulating coating of polyolefin based resin that is an olefin based resin, use of the adhesive layer of silicone based resin or rubber based resin results in a poor adhesiveness (water stopping performance) between the insulating coating and the waterproofing resin portion. Therefore, water easily infiltrates into the portion where the core wire and the metal terminal are connected to each other, which causes corrosion and contact failures in the core wire and the portion to which the metal terminal is connected.

On the other hand, JP 2006-123458A shows that in the process for producing the waterproof electric wire with a terminal, an adhesiveness between the insulating coating of olefin based resin and the adhesive is enhanced by applying corona discharge treatment or plasma discharge treatment to the insulating coating of the insulated electric wire.

However, if corona discharge treatment or plasma discharge treatment is performed in the process for producing the electric wire with a terminal, production man-hours increase and the introduction of expensive facilities is needed.

SUMMARY

It is an object of embodiments of the present application to enhance water stopping performance of a portion between an insulating coating of polyolefin based resin and a waterproofing resin portion in an electric wire with a terminal having the waterproofing resin portion that covers the portion where an insulated electric wire and a metal terminal are connected to each other without increasing production man-hours and facilities.

The electric wire with a terminal according to an embodiment of the present application includes the elements described below.

(1) The first element is an insulated electric wire including a conductive core wire and an insulating coating of polyolefin based resin that covers a circumference of the core wire.

(2) The second element is a metal terminal that is electrically connected to the core wire at an end portion of the insulated electric wire.

(3) The third element is an adhesive layer that includes a composition of a copolymer of ethylene and glycidyl methacrylate and a phenol based curing agent, and is formed over an entire circumference of a surface of the insulating coating at an end portion of the insulated electric wire.

(4) The fourth element is a waterproofing resin portion that includes aromatic nylon and is formed by insert molding using, as an insert portion, a protected region including a region at least between a portion of the insulated electric wire where the adhesive layer is formed and a portion where the metal terminal is connected to the core wire, the waterproofing resin portion covering the protected region.

In the electric wire with a terminal according to embodiments of the present application, the adhesive layer may be made of a material in which a rate of elongation is at least 104.7% in an environment at −40° C. when tested in accordance with JIS K6251.

Also, in the electric wire with a terminal according to embodiments of the present application, the adhesive strength of the insulating coating and the adhesive layer may be 183 kPa or more in an environment at 150° C. when tested in accordance with JIS K6850.

Moreover, a method for producing the electric wire with a terminal according to embodiments of the present application is provided. The method may include connecting a metal terminal to an end portion of an insulated electric wire; wrapping an adhesive layer comprising a composition of a copolymer of ethylene, glycidyl methacrylate, and a phenol based curing agent around an entire circumference of an insulating coating at the end portion of the insulated electric wire; bonding the adhesive layer wrapped around the end portion of the insulated electric wire to the insulating coating of the insulated electric wire by heating; and shaping by insert molding, using a protected region in the insulated electric wire as an insert portion, a resin material comprising aromatic nylon into a waterproofing resin portion, wherein a shape of the waterproofing resin portion covers the protected region.

With embodiments of the present application, it is possible to enhance water stopping performance of a portion between an insulating coating of polyolefin based resin and a waterproofing resin portion in an electric wire with a terminal having the waterproofing resin portion that covers the portion where an insulated electric wire and a metal terminal are connected to each other without increasing production man-hours and facilities.

Moreover, with the production method according to embodiments of the present application, as described further below, the lead time for producing the electric wire with a terminal according to embodiments of the present application is considerably shortened.

DETAILED DESCRIPTION

Figure 1:
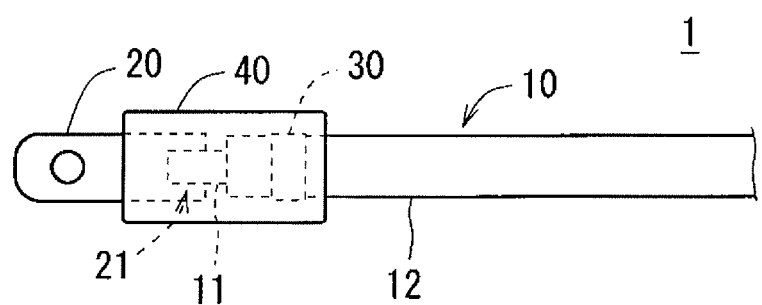
FIG. 1(a) is a plan view of an electric wire with a terminal according to an embodiment of the present application.
FIG. 1(b) is a plan view of an electric wire 1 with a terminal according to an embodiment of the present application.
Figure 1:
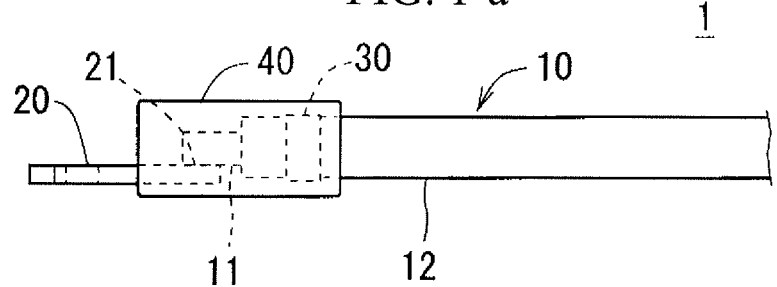

Hereinafter, embodiments of the present application will be described with reference to the attached drawings. The following embodiments are merely specific examples of the present invention, and are not to restrict the technical scope of the present invention.

First, a configuration of an electric wire 1 with a terminal according to an embodiment of the present application will be described with reference to FIGS. 1(a) and 1(b). As shown in FIGS. 1(a) and 1(b), the electric wire 1 with a terminal includes an insulated electric wire 10, a metal terminal 20, an adhesive layer 30, and a waterproofing resin portion 40.

The insulated electric wire 10 includes a conductive core wire 11 and an insulating coating 12 of polyolefin based resin that covers the circumference of the core wire 11. In the insulated electric wire 10, the end portion of the core wire 11 extends from the end portion of the insulating coating 12.

The core wire 11 is made of a metal material such as copper, copper alloy, or aluminum alloy. On the other hand, the insulating coating 12 is made of polyolefin based resin such as cross-linked polyethylene or cross-linked polypropylene.

The metal terminal 20 is electrically connected to the core wire 11 at the end portion of the insulated electric wire 10. The metal terminal 20 is a fitting made of a metal material such as copper or copper alloy. The metal terminal 20 is a portion that is connected to a connecting partner such as a bus bar, a terminal of an electric device or a terminal of another electric wire with a terminal. In the example shown in FIGS. 1(a) and 1(b), the metal terminal 20 is a plate-shaped terminal provided with a through hole into which a screw is inserted. However, it is conceivable that the metal terminal 20 has a different shape such as a plate shape without a through hole or a bar shape.

For example, the metal terminal 20 is fixed to the core wire 11 at the end portion of the insulated electric wire 10 by ultrasonic welding or the like. Alternatively, if the metal terminal 20 is a crimp terminal in which crimped portions to be crimped to the core wire 11 of the insulated electric wire 10 and the insulating coating 12 are formed, the metal terminal 20 is crimped to the end portion of the insulated electric wire 10 and is fixed thereto.

The adhesive layer 30 is a layer of an adhesive formed over the entire circumference of the surface of the insulating coating 12 at the end portion of the insulated electric wire 10. The adhesive layer 30 bonds the outside surface of the insulating coating 12 to the inside surface of the waterproofing resin portion 40 and closes the gap therebetween.

The waterproofing resin portion 40 is a resin member formed by insert molding using a predetermined protected region at the end portion of the electric wire 1 with a terminal as an insert portion so as to cover the protected region. The protected region includes a region at least between a portion in which the adhesive layer 30 is formed in the insulated electric wire 10 and a portion 21 where the metal terminal 20 is connected to the core wire 11.

A feature of the electric wire 1 with a terminal is the combination of materials for the adhesive layer 30 and the waterproofing resin portion 40 that face the insulating coating 12 of polyolefin based resin. That is, in the electric wire 1 with a terminal, the adhesive layer 30 is a layer of an adhesive including a composition of a copolymer of ethylene and glycidyl methacrylate and a phenol based curing agent. Furthermore, the waterproofing resin portion 40 is a resin member including aromatic nylon. In the following description, copolymers of ethylene and glycidyl methacrylate are referred to as "ET-GMA copolymers".

In the resin composition (adhesive) that is a base material for the adhesive layer 30, the phenol based curing agent serves as a cross-linking agent. The phenol based curing agent may be a novolac type phenol resin or a resol type phenol resin. It should be noted that if a novolac type phenol resin is used, a cross-linking reaction proceeds by heating the novolac type phenol resin together with a curing agent, and the resin is three-dimensionally cross-linked and is cured. On the other hand, if a resol type phenol resin is used, a cross-linking reaction proceeds by heating the resol type phenol resin itself, and the resin is three-dimensionally cross-linked and is cured.

Moreover, in the resin composition (adhesive) that serves as a base material for the adhesive layer 30, glycidyl methacrylate included in the ET-GMA copolymer is a bifunctional monomer having an acrylic group and an epoxy group. When the ET-GMA copolymer is included therein, effects such as the enhancement of the heat resistance and the enhancement of the oil resistance are obtained.

Method for Producing Electric Wire 1 with Terminal

Next, an outline of a method for producing the electric wire 1 with a terminal will be described with reference to FIGS. 2(a)-(c). It should be noted that FIGS. 2(a)-(c) are schematic views showing a procedure for producing the electric wire 1 with a terminal.

In the process for producing the electric wire 1 with a terminal, first, a terminal connecting step is performed. The terminal connecting step is a step in which the metal terminal 20 is attached to the end portion of the insulated electric wire 10 by welding or crimping. Thereby, as shown in FIG. 2(a), the core wire 11 of the insulated electric wire 10 and the metal terminal 20 are integrally and electrically connected to each other.

It should be noted that, in FIG. 2(a), the metal terminal 20 that is not yet connected to the insulated electric wire 10 is drawn by virtual lines (dot-dot-dash lines).

Next, as shown in FIG. 2(b), a sheet wrapping step is performed. The sheet wrapping step is a step in which an adhesive sheet 30S that is an adhesive in form of a sheet is wrapped around the entire circumference of the insulating coating 12 at the end portion of the insulated electric wire 10. Here, the adhesive sheet 30S is an adhesive in form of a sheet including a composition of an ET-GMA copolymer and a phenol based curing agent. The adhesive sheet 30S is formed with a thickness of approximately several tens of micrometers to several hundreds of micrometers, for example.

It should be noted that, in FIG. 2(b), the adhesive sheet 30S that is not yet wrapped around the insulated electric wire 10 is drawn by virtual lines (dot-dot-dash lines).

In the sheet wrapping step, a terminal portion of the adhesive sheet 30S wrapped around the insulating coating 12 is temporarily fixed to other portions of the adhesive sheet 30S by being heated with a heated metal member or the like. Thereby, the adhesive sheet 30S is maintained in an annular shape in a state of being wrapped around the insulating coating 12. The adhesive sheet 30S that serves as a base of the adhesive layer 30 includes thermoplastic synthetic resin, and is a so-called hot melt type adhesive.

Next, as shown in FIG. 2(c), a bonding step is performed. The bonding step is a step in which the adhesive sheet 30S wrapped around the end portion of the insulated electric wire 10 is bonded to the insulating coating 12 of the insulated electric wire 10 by being heated by a heater 51. Thereby, the adhesive layer 30 including the composition of the ET-GMA copolymer and the phenol based curing agent is formed on the surface of the insulating coating 12 at the end portion of the insulated electric wire 10.

When the adhesive sheet 30S is used, an applying step in which an adhesive diluted with a volatile solvent is applied to the surface of the insulating coating 12 and a drying step in which the solvent is volatilized are not needed. Generally, it takes a long time in the drying step in order to completely volatilize the solvent. Accordingly, the lead time for producing the electric wire 1 with a terminal is considerably shortened by omitting the drying step.

Lastly, as shown in FIG. 2(d), an insert molding step is performed. The insert molding step is a step in which a resin material 40P including aromatic nylon in a molten state is shaped into the waterproofing resin portion 40 with a shape covering the protected region of the electric wire 1 with a terminal by insert molding using the protected region in the insulated electric wire 10 as an insert portion.

In the insert molding step, first, the protected region in the electric wire 1 with a terminal is disposed at a predetermined position inside a metal mold 52 for shaping the waterproofing resin portion 40. After that, the resin material 40P including aromatic nylon in a molten state is injected from a resin supplying device 53 into the metal mold 52. Thereby, the waterproofing resin portion 40 including aromatic nylon is shaped into a shape covering the protected region in the electric wire 1 with a terminal.

It should be noted that the drawing of the metal mold 52 shown in FIG. 2(d) is a cross-sectional view of the metal mold 52.

The adhesive layer 30 that has hardened before insert molding is temporarily softened by heat of the molten resin in insert molding, and is welded to the molded waterproofing resin portion 40. Thereby, the waterproofing resin portion 40 bonded to the insulating coating 12 of the insulated electric wire 10 with the adhesive layer 30 is formed.

Incidentally, it is important that the adhesive layer 30 does not peel off the insulating coating 12 due to pressure received from the injected molten resin during insert molding. That is, the adhesive strength of the insulating coating 12 and the adhesive layer 30 needs to be greater than the maximum shearing stress received from the molten resin during the insert molding. With this taken into consideration, the adhesive strength of the insulating coating 12 and the adhesive layer 30 may be 183 kPa or more in the environment at 150° C. (ambient temperature) when tested in accordance with JIS K6850.

Since both the ethylene included in the adhesive layer 30 and the polyolefin based resin included in the insulating coating 12 are olefin based resins, they are easily and firmly coupled to each other at a molecular level.

Moreover, the glycidyl methacrylate included in the adhesive layer 30 has a polar group (epoxy group), and the aromatic nylon serving as a material for the waterproofing resin portion 40 also has a polar group (amide group). Therefore, the adhesive layer 30 and the waterproofing resin portion 40 are firmly connected to each other by attraction of the polar groups.

As described above, the insulating coating 12 of polyolefin based resin and the waterproofing resin portion 40 including aromatic nylon are firmly bonded to each other with the adhesive layer 30 including the composition of the ET-GMA copolymer and the phenol based curing agent. In addition, the adhesive layer 30 including the ET-GMA copolymer has sufficient elasticity capable of coping with the difference in the thermal expansion between the insulating coating 12 and the waterproofing resin portion 40 and has excellent water resistance as well. Accordingly, when the electric wire 1 with a terminal is used, it is possible to enhance water stopping performance of the portion between the insulating coating 12 and the waterproofing resin portion 40. In addition, when the electric wire 1 with a terminal is used, production man-hours and facilities need not be increased.

Furthermore, the adhesive layer 30 including the ET-GMA copolymer and the waterproofing resin portion 40 including aromatic nylon have excellent oil resistance. Therefore, the electric wire 1 with a terminal is also suitable for use in a place where oil such as engine oil and brake oil may be attached thereto in a car. Also, the adhesive layer 30 including the phenol based curing agent has excellent heat resistance. Therefore, the electric wire 1 with a terminal is also suitable for use in a place where a temperature becomes high in a car.

Moreover, a resin including the composition of the ET-GMA copolymer and the phenol based curing agent can be formed into a sheet shape. Accordingly, in a step of forming the adhesive layer 30, it is possible to adopt a step of wrapping the adhesive sheet 30S around the insulated electric wire 10 and heating the adhesive sheet 30S. In this case, an applying step in which an adhesive diluted with a volatile solvent is applied to the surface of the insulating coating 12 and a drying step in which the solvent is volatilized are not needed. As a result, the lead time for producing the electric wire 1 with a terminal is considerably shortened.

Incidentally, a wire harness mounted in a car may be generally used in the environment at a temperature in a range of −40° C. to 150° C. Moreover, in many cases, the insulating coating 12 of the insulated electric wire 10 has a thickness of 0.7 mm or less. Furthermore, in order to reduce the weight of the waterproofing resin portion 40 to a minimum while satisfying the strength conditions required for the waterproofing resin portion 40, the waterproofing resin portion 40 may have a thickness of approximately 1.0 mm.

Accordingly, in the electric wire 1 with a terminal for a car, the adhesive layer 30 may have elasticity coping with the difference in the thermal expansion between the insulating coating 12 and the waterproofing resin portion 40 in the conditions described above. To achieve this, the adhesive layer 30 may be made of a material in which the rate of elongation is 104.7% or more in the environment at −40° C. (ambient temperature), which is the severest environmental temperature in terms of elasticity, when tested in accordance with JIS K6251.

Evaluation Tests and Evaluation Results

Figures 3, 4:
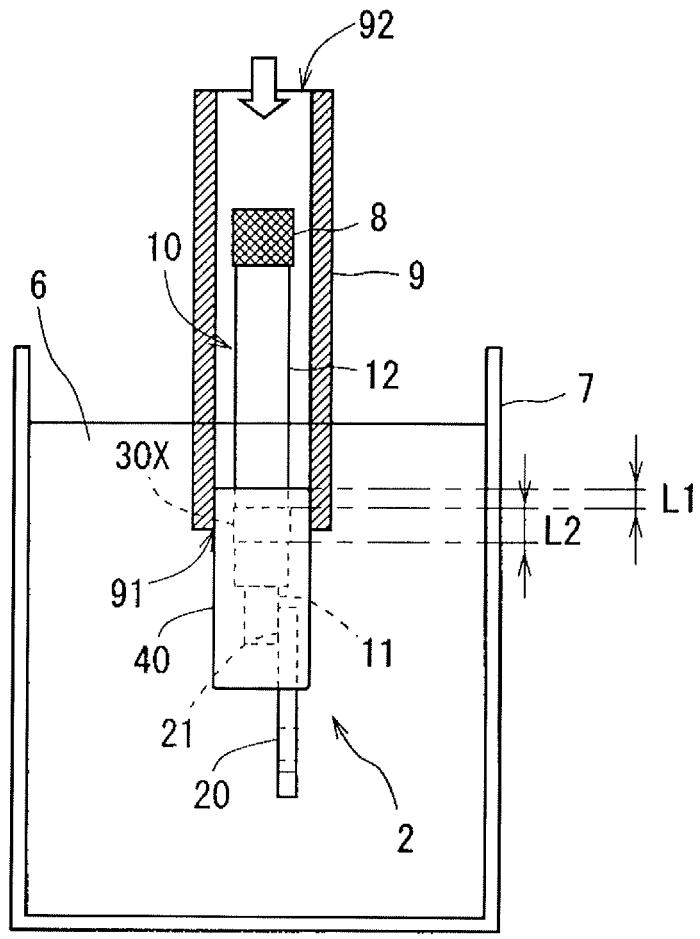
FIG. 3 is a schematic view showing a test method for evaluating waterproof performance of the electric wire with a terminal according to an embodiment of the present application.
FIG. 4 is a drawing showing the evaluation results of the waterproof performance of the electric wire with a terminal according to an embodiment of the present application.

Hereinafter, a method for evaluating the waterproof performance of the electric wire 1 with a terminal and evaluation results thereof will be described with reference to FIGS. 3 and 4. FIG. 3 is a schematic view showing a test method for evaluating the waterproof performance of the electric wire 1 with a terminal.

A test for evaluating the waterproofing performance of the electric wire 1 with a terminal compares the electric wire 1 with a terminal with two types of electric wires with a terminal in which only the materials for the adhesive layer are different from that in the electric wire 1 with a terminal. In the following description, three types of the electric wires with a terminal to be evaluated are collectively referred to as an evaluation sample 2. Moreover, a reference numeral 30X shown in FIG. 3 indicates an adhesive layer of the evaluation sample 2.

Figure 2:
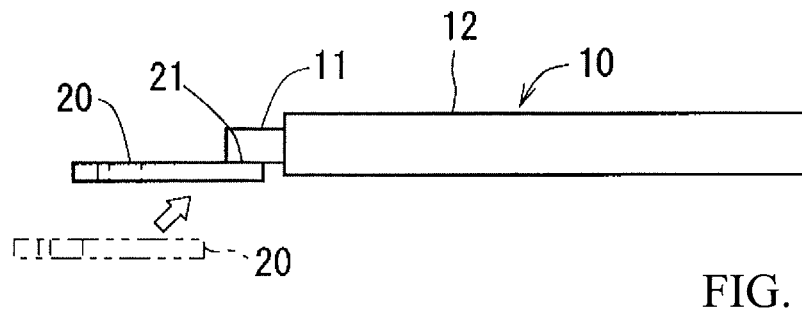
FIG. 2(a) is a schematic view showing a procedure for producing the electric wire with a terminal according to an embodiment of the present application.
FIG. 2(b) is a schematic view showing a procedure for producing the electric wire with a terminal according to an embodiment of the present application.
FIG. 2(c) is a schematic view showing a procedure for producing the electric wire with a terminal according to an embodiment of the present application.
FIG. 2(d) is a schematic view showing a procedure for producing the electric wire with a terminal according to an embodiment of the present application.
Figure 2:
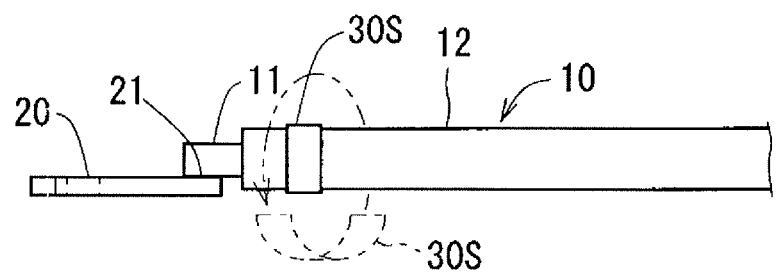
Figure 2:
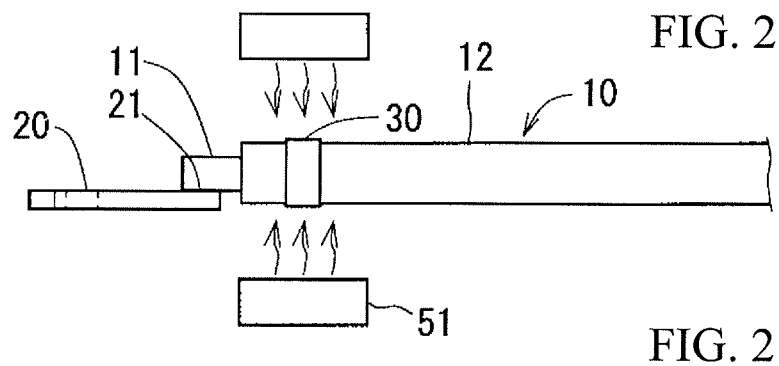
Figure 2:
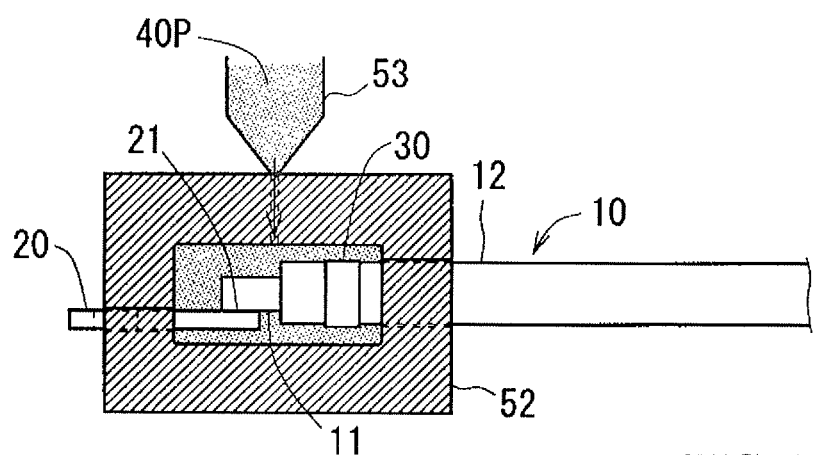

It should be noted that, in FIG. 3, the same elements as the elements shown in FIGS. 1 and 2 are denoted by identical reference numerals.

As shown in FIG. 3, in the evaluation sample 2, the end portion on the opposite side of the portion to which the metal terminal 20 is connected in the insulated electric wire 10 is sealed by a blocking material 8 such as a heat shrinkable tube so as to prevent air from entering the inside of the insulating coating 12.

Moreover, in the evaluation sample 2, a dimension L1 from the end of the waterproofing resin portion 40 to the adhesive layer 30X is 2 mm. That is, the adhesive layer 30X is formed at a position that is 2 mm away from the end of the waterproofing resin portion 40. Furthermore, in the evaluation sample 2, the adhesive layer 30X has a width L2 of 10 mm. In addition, the adhesive layer 30X has a thickness of 10 μm or more.

Moreover, in the evaluation sample 2, the core wire 11 has a diameter of 2.4 mm, the insulating coating 12 has a thickness of 0.7 mm, and a portion that covers the insulating coating 12 in the waterproofing resin portion 40 has a thickness of 2.02 mm.

Moreover, in the evaluation test, a portion in the evaluation sample 2 between a portion of the waterproofing resin portion 40 and the end portion of the insulated electric wire 10 on the side of the portion sealed by the blocking material 8 is maintained in a state of being inserted into the cylindrical member 9. Furthermore, one opening 91 of the cylindrical member 9 is sealed by the waterproofing resin portion 40.

Moreover, in the evaluation test, a region in the evaluation sample 2 between the metal terminal 20 on the tip end and a portion of the insulated electric wire 10 surrounded by the cylindrical member 9 is immersed in water 6 stored in a tank 7. Furthermore, in the evaluation test, compressed air with a maximum pressure of 100 kPa is supplied from the other opening 92 of the cylindrical member 9.

In the evaluation test described above, if no air bubbles are produced from a gap between the waterproofing resin portion 40 and the metal terminal 20 in the evaluation sample 2, the evaluation sample 2 passes the test (OK), and if air bubbles are produced therefrom, the evaluation sample 2 does not pass the test (NG). Moreover, the evaluation tests were performed under 4 test conditions EC1 to EC4 at different temperatures (ambient temperatures).

In the first test condition EC1, the ambient temperature is kept at a normal temperature (approximately 25° C.). In the second test condition EC2, the ambient temperature is kept at 150° C. In the third test condition EC3, the ambient temperature is kept at −40° C. In the fourth test condition EC4, the ambient temperature is changed between −40° C. and 100° C. for 5 minutes, and is kept at −40° C. or 100° C. for 30 minutes.

FIG. 4 is a drawing showing the evaluation results of the waterproof performance of the electric wire 1 with a terminal. In FIG. 4, reference numerals S0, S1, and S2 are identification reference numerals of three types of the evaluation samples 2.

A first evaluation sample S0 is the electric wire 1 with a terminal. That is, the adhesive layer 30X of the first evaluation sample S0 is a layer of an adhesive including the composition of the ET-GMA copolymer and the phenol based curing agent. On the other hand, the adhesive layer 30X of a second evaluation sample S1 is a layer of a silicone based adhesive. In addition, the adhesive layer 30X of a third evaluation sample S2 is a layer of a butyl rubber based adhesive.

Moreover, in FIG. 4, "OK" shows that no air bubbles are produced from a gap between the waterproofing resin portion 40 and the metal terminal 20 in the evaluation sample 2 and the evaluation sample 2 passes the test, and "NG" shows that air bubbles are produced therefrom and the evaluation sample 2 does not pass the test.

As shown in FIG. 4, under the second test condition EC2 in which the ambient temperature is kept at 150° C., favorable results were obtained from all of the 3 types of the evaluation samples 2. However, under the other ambient temperature conditions, favorable results were obtained only from the electric wire 1 with a terminal with the adhesive layer 30X including the composition of the ET-GMA copolymer and the phenol based curing agent, and favorable results were not obtained from the other evaluation samples 2. The evaluation results described above demonstrated that the electric wire 1 with a terminal has excellent water stopping performance.

LIST OF REFERENCE NUMERALS

1 Electric wire with terminal
2 Evaluation sample
EC1, EC2, EC3, EC4 Identification reference numeral of test condition (temperature condition)
S0, S1, S2 Identification reference numeral of evaluation sample
6 Water
7 Tank
8 Blocking material
9 Cylindrical member
10 Insulated electric wire
11 Core wire
12 Insulating coating
20 Metal terminal
21 Connection portion 30, 30X Adhesive layer
30S Adhesive sheet
40 Waterproofing resin portion
40P Resin material
51 Heater
52 Metal mold
53 Resin supplying device
91, 92 Opening of cylindrical member

The invention claimed is:

1. An electric wire with a terminal comprising:
an insulated electric wire comprising:
 a conductive core wire; and
 an insulating coating of polyolefin based resin that covers a circumference of the core wire;
a metal terminal electrically connected to the core wire at an end portion of the insulated electric wire;
an adhesive layer that comprises a composition of a copolymer of ethylene, glycidyl methacrylate, and a phenol based curing agent, and is formed over an entire circumference of a surface of the insulating coating at an end portion of the insulated electric wire; and
a waterproofing resin portion that comprises aromatic nylon and is formed by insert molding using, as an insert portion, a protected region, wherein
the protected region comprises a region that is at least disposed between a portion of the insulated electric wire where the adhesive layer is formed and a portion where the metal terminal is connected to the core wire,
the waterproofing resin portion covers protected region, and
the adhesive layer bonds an outside surface of the insulating coating to an inside surface of the waterproofing resin portion.

2. The electric wire with a terminal according to claim 1, wherein the adhesive layer comprises a material in which a rate of elongation is at least 104.7% in an environment at −40° C. when tested in accordance with JIS K6251.

3. The electric wire with a terminal according to claim 2, wherein an adhesive strength of the insulating coating and the adhesive layer is 183 kPa or more in an environment at 150° C. when tested in accordance with JIS K6850.

4. The electric wire with a terminal according to claim 1, wherein an adhesive strength of the insulating coating and the adhesive layer is 183 kPa or more in an environment at 150° C. when tested in accordance with JIS K6850.

5. The electric wire with a terminal according to claim 1, wherein the phenol based curing agent comprises at least one of a novolac type phenol resin or a resol type phenol resin.

6. The electric wire with a terminal according to claim 1, wherein the glycidyl methacrylate is a bifunctional monomer comprising an acrylic group and an epoxy group.

7. The electric wire with a terminal according to claim 1, wherein the water proof resin portion has a thickness of approximately 1.0 mm.

8. The electric wire with a terminal according to claim 1, wherein the adhesive layer has an elasticity that copes with a difference in thermal expansion between the insulating coating and the waterproofing resin portion.

9. A method for producing an electric wire with a terminal comprising:
connecting a metal terminal to an end portion of an insulated electric wire;
wrapping an adhesive layer comprising a composition of a copolymer of ethylene, glycidyl methacrylate, and a phenol based curing agent around an entire circumference of an insulating coating at the end portion of the insulated electric wire;
bonding the adhesive layer wrapped around the end portion of the insulated electric wire to the insulating coating of the insulated electric wire by heating; and
shaping by insert molding, using a protected region in the insulated electric wire as an insert portion, a resin material comprising aromatic nylon into a waterproofing resin portion, wherein
a shape of the waterproofing resin portion covers the protected region, and
the adhesive layer bonds an outside surface of the insulating coating to an inside surface of the waterproofing resin portion.

10. The method for producing an electric wire with a terminal according to claim 9, wherein the metal terminal and the end portion of the insulated electric wire are connected by welding or crimping.

11. The method for producing an electric wire with a terminal according to claim 9, wherein during the wrapping, a terminal portion of the adhesive layer wrapped around the insulating coating is temporarily fixed to another portion of the adhesive layer by heating.

12. The method for producing an electric wire with a terminal according to claim 9, wherein during shaping, the protected region is disposed at a predetermined position inside a metal mold for shaping the waterproofing resin portion, and
wherein the resin material is injected in a molten state from a resin supplying device to the metal mold thereby shaping the waterproof resin portion into the shape of the waterproofing resin portion that covers the protected region.

13. The method for producing an electric wire with a terminal according to claim 12, wherein the adhesive layer is hardened before the insert molding is temporarily softened by heat of the resin in the molten state and the adhesive layer is welded to the waterproofing resin portion.

14. The method for producing an electric wire with a terminal according to claim 9, wherein the adhesive layer comprises a sheet-like shape.

15. The method for producing an electric wire with a terminal according to claim 9, wherein the adhesive layer comprises a material in which a rate of elongation is at least 104.7% in an environment at −40° C. when tested in accordance with JIS K6251.

16. The method for producing an electric wire with a terminal according to claim 15, wherein an adhesive strength of the insulating coating and the adhesive layer is 183 kPa or more in an environment at 150° C. when tested in accordance with JIS K6850.

17. The method for producing an electric wire with a terminal according to claim 9, wherein an adhesive strength of the insulating coating and the adhesive layer is 183 kPa or more in an environment at 150° C. when tested in accordance with JIS K6850.

18. The method for producing an electric wire with a terminal according to claim 9, wherein the phenol based curing agent comprises at least one of a novolac type phenol resin or a resol type phenol resin.

19. The method for producing an electric wire with a terminal according to claim 9, wherein the adhesive layer has an elasticity that copes with a difference in thermal expansion between the insulating coating and the waterproofing resin portion.

* * * * *